United States Patent [19]

Ota et al.

[11] Patent Number: 4,477,852

[45] Date of Patent: Oct. 16, 1984

[54] MAGNETO-OPTICAL RECORDING AND REPRODUCING SYSTEM

[75] Inventors: Chuichi Ota, Fuchu; Nobutake Imamura, Tokyo; Shinsuke Tanaka, Kamakura, all of Japan

[73] Assignee: Kokusai Denshin Denwa Kabushiki Kaisha, Tokyo, Japan

[21] Appl. No.: 358,040

[22] Filed: Mar. 15, 1982

[30] Foreign Application Priority Data

Mar. 28, 1981 [JP]  Japan .................................. 56-45760

[51] Int. Cl.$^3$ .............................................. G11B 5/32
[52] U.S. Cl. .................................................... 360/114
[58] Field of Search .................. 360/114, 113; 365/10, 365/64, 215

[56] References Cited

U.S. PATENT DOCUMENTS 3,829,847  8/1974  Masi .................................. 365/64 X
3,905,040  9/1975  Otala .................................. 365/10 X

OTHER PUBLICATIONS

IBM/TOB, vol. 11, No. 10, Mar. 1969, "Recording & Readout System", by Voegeli, p. 1366.

Primary Examiner—John H. Wolff
Attorney, Agent, or Firm—Robert E. Burns; Emmanuel J. Lobato; Bruce L. Adams

[57] ABSTRACT

A magneto-optical recording and reproducing apparatus for recording information on a recording medium made of a magneto-optical recording material. The apparatus is provided with at least two lasers for carrying out simultaneously a combination of two functions of the apparatus such as recording-reproducing or reproducing-erasing or erasing-recording functions. The recording and erasing is effected optically by independent light beams. Provision is made for recording and erasing the information by light beam and by use of an application of magnetic fields of different coercive values. The lasers are modulated or not independently and an optical system is provided through which the write-in and readout takes place and focusing is in response to the reflected light from the record on the recording medium.

13 Claims, 11 Drawing Figures

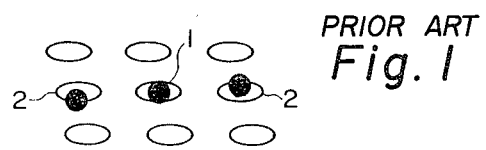
PRIOR ART
Fig. 1
Fig. 2A
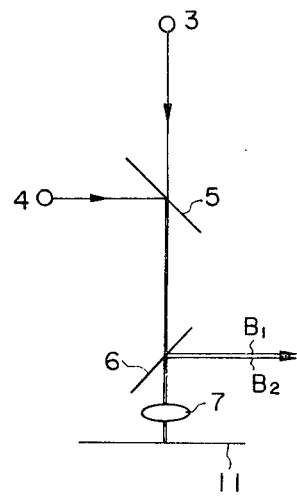
Fig. 2B
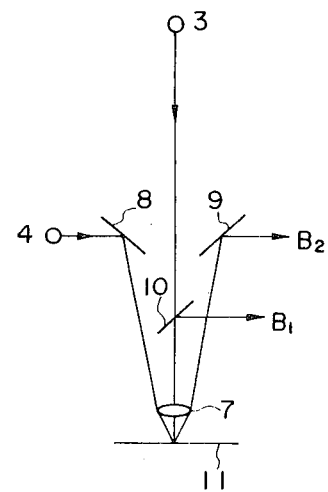
Fig. 3
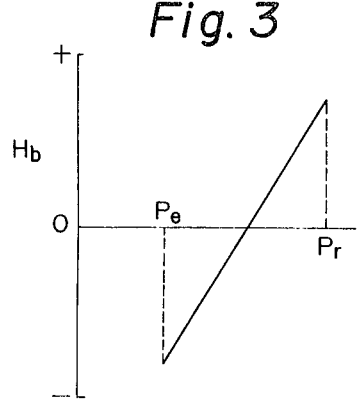

MAGNETO-OPTICAL RECORDING AND REPRODUCING SYSTEM

BACKGROUND OF THE INVENTION

The present invention relates to a recording and reproducing device for use with a magneto-optical recording medium, and more particularly to a magneto-optical recording and reproducing device which is arranged so that it is able to simultaneously perform a plurality of operations such as erasing, recording and reproducing and to make up the shortage of power for erasing and recording.

Conventional magnetic recording and reproducing devices employing a magneto-optical recording medium are roughly divided into the one-beam type and the three-beam type. The former performs recording and reproducing with one beam and also uses the same beam for tracking. In contrast thereto, the latter employs two beams for tracking use separately of a beam for recording and reproducing and performs tracking servo based on a difference between the two beams as illustrated in U.S. Pat. No. 3,905,040 to Otala. Either system uses the same beam for recording and reproducing. Recording takes place by irradiating the magneto-optical recording medium by a laser beam to raise the temperature of the irradiated portion, reducing its coercive force to cause a reversal of magnetization of that portion to the direction of the magnetic field. On the other hand, reproducing is performed by irradiating the recording medium by the same beam weakened to such an extent as not to destroy the record and detecting the rotation of the plane of polarization of reflected or transmitted light from the medium in accordance with the direction of its magnetization. The magneto-optical recording medium makes a great feature of arbitrary erasing and restoring of records. According to the prior art system, in the case of storing new information in a recording medium having already recorded thereon information, a portion of a recording track where the new information is to be recorded is entirely scanned by a beam in the presence of a homogeneous magnetic field perpendicular to the surface of the medium to lower its coercive force, directing the magnetization of the medium to the same direction as the ambient magnetic field. This corresponds to erasing. Next, a magnetic field opposite in direction to that employed for erasing is applied to the recording medium to store thereon the new information on the aforementioned principle. For checking whether or not the information has been correctly recorded, it is necessary to reproduce the entire recorded information. The conventional system thus employs the same beam for all of the erasing, recording and reproducing operations, and consequently it has the defect that only one operation can be performed at one time.

SUMMARY OF THE INVENTION

An object of the present invention is to provide a magneto-optical recording and reproducing system which is designed so that a plurality of beams are used in an optical system and one servo system to permit two or three of the erasing, recording and reproducing operations to be performed concurrently and that the shortage of power can be filled up by a plurality of beams in the case of using a recording medium requiring a high laser power for recording or erasing.

In accordance with the present invention, there is provided a magneto-optical recording and reproducing system comprising: a magneto-optical recording medium having a magnetization vector perpendicular to its film surface; optical system means for generating a plurality of beams through the use of light from a plurality of light sources; mode magnetic field generation means for generating a mode magnetic field taking either a forward or backward direction along the beams at a plurality of irradiating positions where the beams are applied to the magneto-optical recording medium; and a drive mechanism for driving the optical system and the mode magnetic field generating means or the magneto-optical recording medium so that the plurality of irradiating positions may shift on the magneto-optical recording medium.

BRIEF DESCRIPTION OF THE ACCOMPANYING DRAWINGS

The present invention will hereinafter be described in detail with reference to the accompanying drawings, in which:

FIG. 1 is a schematic diagram explanatory of a conventional magneto-optical recording and reproducing system;

FIGS. 2A and 2B are system diagrams illustrating embodiments of an optical arrangement of the present invention;

FIG. 3 is a graph showing the characteristic of a mode magnetic field for use in the present invention;

DETAILED DESCRIPTION

Figure 4:
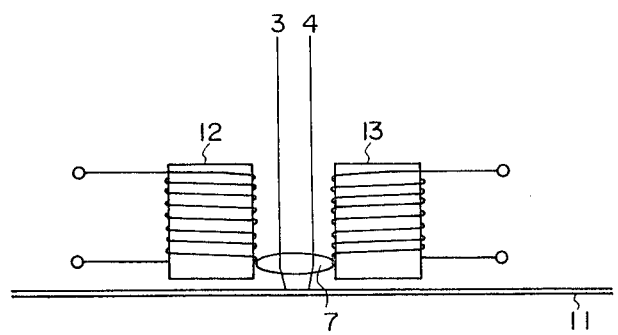
FIG. 4 is a schematic side view illustrating a specific example of mode magnetic field generating means for use in the present invention.

With reference to FIG. 1, a conventional three beam system employs two beams 2 for tracking use separately of a beam 1 for recording and reproducing. This conventional system has the above-mentioned defects.

While in the following the present invention will be described mainly in connection with the case of two beams for convenience' sake, the invention is also applicable to the case of three or more beams.

The erasing, recording and reproducing operations using a laser beam call for a complex optical system and servo system for an automatic focusing control mechanism and an automatic tracking mechanism and, accordingly, also in case of performing such operations by a plurality of beams, it is inefficient if the optical and servo systems are not used in common to them. Various forms can be considered for utilizing an optical system with a plurality of beams; two examples are shown in FIGS. 2A and 2B. These examples are arranged so that beams 3 and 4 are brought by a half mirror 5, a total reflection mirror 8 and an objective lens 7 to focus to adjacent positions on the same circumference on a disc surface 11, and that their reflected lights are taken out in a desired direction through the half mirrors 6 and 10 and a total reflection mirror 9.

Combinations of those two of the three operations of erasing, recording and reproducing which are likely to be concurrently performed are as follows:
  (i) Recording-Reproducing
  (ii) Reproducing-Erasing
  (iii) Erasing-Recording The combination (i) can be achieved, for example, by recording with a first beam in a state in which a mode magnetic field for determining the mode of operation is applied to the recording medium in an upward direction and then reproducing the record by irradiating the recording medium by a second beam of a fixed intensity which is so low as not to destroy the record. (This irradiation will hereinafter be referred to as the DC irradiation.)

Figure 7:
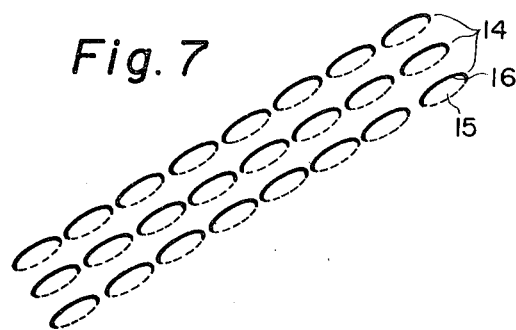
FIG. 7 is a schematic diagram showing stored bits explanatory of the operation of this invention system.

Since erasing is carried out by the DC irradiation, there is no possibility of records being left unerased in the track direction but the erasing beam may deflect slightly in the radial direction. If the erasing beam has exactly the same diameter and power as those of the recording beam, there is the likelihood that if the beam deflects when erasing bit trains 14 stored as shown in FIG. 7, only recording areas 15 are erased but leaving the others 16 unerased. In view of this, it is necessary to somewhat strengthen the power of the erasing beam so that the stored areas can be erased with a margin.

The following Table 1 is a summary of the operations (i) to (iii) described above. For convenience' sake, the direction of the mode magnetic field is upward in the case of recording, and the beam which is applied first to the recording medium is referred to as the beam 1. It is needless to say that in an actual device, such change-over is automatically set by turning a switch to positions (i) to (iii), respectively.

TABLE 1

|  | Beam 1 | | | | Beam 2 | | | |
| --- | --- | --- | --- | --- | --- | --- | --- | --- |
|  | Use | Power | Irradiation system | Magnetic field immediately below | Use | Power | Irradiation system | Magnetic field immediately below |
| Operation (i) | recording | medium | modulation | upward | reproducing | weak | DC | unlimited |
| Operation (ii) | reproducing | weak | DC | unlimited | erase | strong | DC | downward |
| Operation (iii) | erasing | strong | DC | downward | recording | medium | modulation | upward |

In the case of the combination (ii), reproducing is effected by the DC irradiation with a first beam of low intensity in the presence of a downward mode magnetic field and then erasing is carried out also by the DC irradiation with a second beam. In this way, the combinations (i) and (ii) can be achieved with ease.

Figure 5:
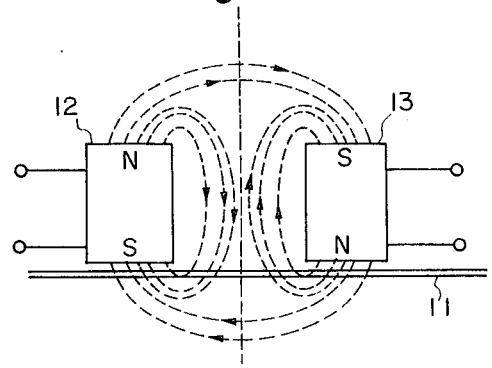
FIG. 5 is a schematic diagram explanatory of an example of the distribution of magnetic fluxes of mode magnetic fields set up by the mode magnetic field generating means in the present invention.

In contrast thereto, the combination (iii) presents a problem. This is because the mode magnetic fields necessary for erasing and recording are opposite in direction to each other. Accordingly, the opposite mode magnetic fields must be applied to two spots on the disc which are sometimes spaced only several micrometers apart. To perform this, it is necessary to impart a spatially steep field gradient to the mode field as shown in FIG. 3 so that opposite mode magnetic fields may be applied to the two spots. This can easily be achieved by disposing two electromagnets 12 and 13 in the front of and at the back of the two spots as shown in FIG. 4 and by flowing a current to them so that the opposite mode magnetic fields may be applied to the spots, respectively. FIG. 5 schematically shown magnetic fluxes emanating from the two electromagnets.

Figure 6:
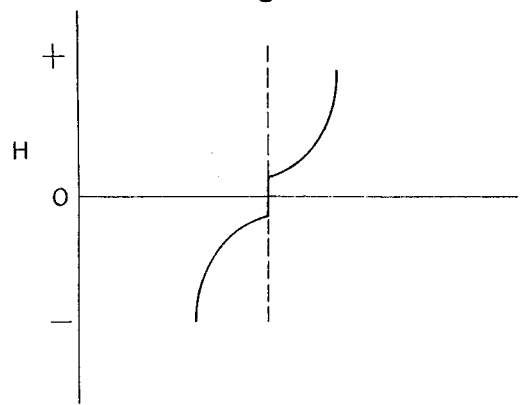
FIG. 6 is a characteristic diagram explanatory of an example of a magnetic field gradient of the mode magnetic field generated by the mode magnetic field generating means for the use in the present invention.

Further, since the field intensity in the vicinity of each electromagnet can be considered to be inversely proportional to the square of the distance from the electromagnet, the magnetic field distribution between these electromagnets becomes such as shown in FIG. 6; this indicates that such a steep magnetic field gradient as depicted in FIG. 3 can be obtained. It is a matter of course that an actual arrangement is equipped with the function of adjusting the positions of the electromagnets so that the boundary between the upward and downward magnetic fields may lie intermediate between the two spots.

It is apparent that the magnetic field generating mechanism, though described above to employ the electromagnets, is not limited specifically thereto but may also use, for example, a permanent magnet capable of changing the direction of a magnetic field.

Figure 8:
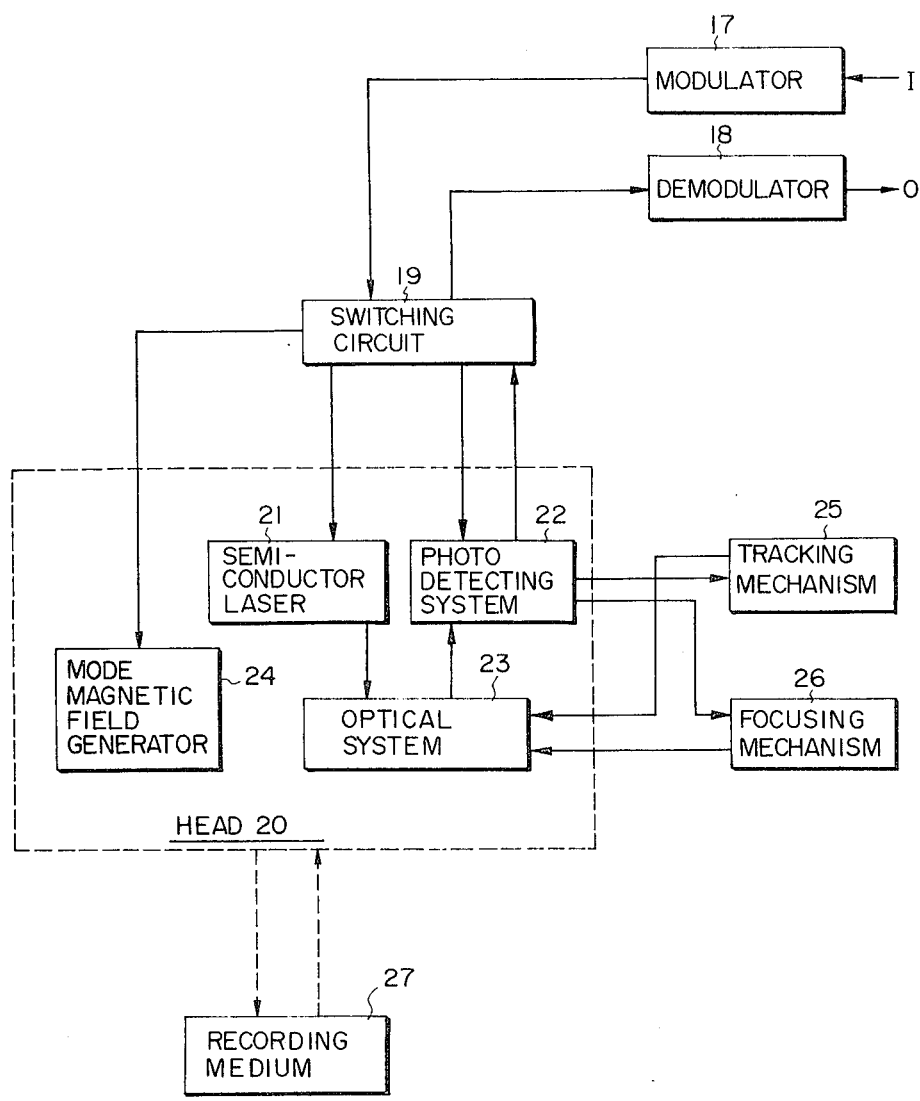
FIG. 8 is a block diagram illustrating an embodiment of the present invention.

FIG. 8 illustrates in block form an arrangement embodying the above. A switching circuit 19 for switching combinations of the recording, reproducing and erasing operations selects such a variety of operations as shown in Table 1; namely, it selects which laser is to be modulated by a signal modulated by a modulator 17 and the reflected beam of which laser is to be detected for application to a demodulator 18 and changes over the laser power and the direction of a magnetic field required for each operation. A head 20 is an assembly of a semiconductor laser means 21 serving as light sources for the beams 1 and 2, a photo detecting system 22 for detecting a reflected light beams from a recording medium 27 in response to the beams 1 and 2, an optical system 23 including at least one lens, at least one mirror and at least one polarizer for optically controlling a corresponding beam, and a mode magnetic field generator 24 including the electromagnetics 12 and 13. A tracking mechanism 25 is one that detects a tracking error by the reflected light beams from the recording medium 27 and deflects a beam in its radial direction to compensate for the error. A focusing mechanism 26 is one that also detects defocusing by the reflected light beams from the recording medium 27 and moves the lens up and down to bring the beam to correctly focus on the recording medium 27.

The operation (i) on the Table 1 is carried out as follows:

(1) The switching circuit 19 selects the following operation modes:

(a) The beam 1 is reset to "recording" while the beam 2 "reproducing".

(b) The powers of the beam 1 and the beam 2 are established to be "medium" and "weak", respectively, as indicated on the Table 1.

(c) In connection with the irradiation system, the beam 1 is modulated by the modulator 17 while the beam 2 is held constant for DC radiation regardless of the modulator 17.

(d) The upward mode magnetic field or the downward mode magnetic field generated by the electromagnets 12 and 13 in the magnetic field generator 24 is reset for "recording". The direction of the mode magnetic field has no direct relation to the reproduction operation since it uses the reflected light beams from the recording medium 27 in response to the beam 2.

(2) The electric signal input of the modulator 17 is modulated by the modulator 17 so that the beam 1 for the recording operation is ON-OFF controlled. The beam 1 ON-OFF controlled is applied to the recording medium 27 through the optical system 23. Information of the electric signal input is stored on the recording medium 27 by applying the upward or downward magnetic field in accordance with the ON-OFF states of the beam 1.

(3) In case of the reproducing, mode of operation, the beam 2 of DC weak power is applied on the recording medium 27 through the optical system 23, so that the reflected light beam is applied, through the optical system 23, to the photo detecting system 22 (including two detectors). In this photo detecting system 22, a rotation of the plane of polarization of the reflected light beam is detected to read out the directions of the mode magnetic field stored on the recording medium 27. The readout signal is transferred through the switching circuit 19 to the demodulator 18 to demodulate into an output information signal 0.

The details of the operation (ii) are omitted since they can be understood from the former description for the combination (ii) Reproducing-Erasing in view of the above operation (i).

Figure 9:
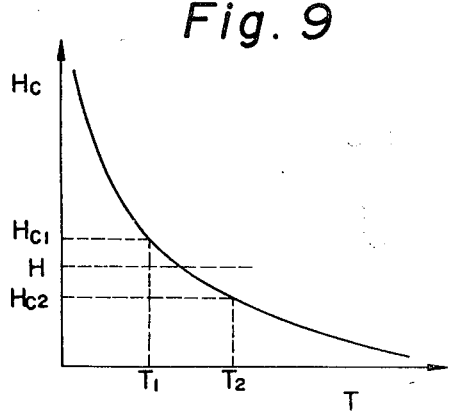
FIGS. 9 and 10 are characteristic diagrams explanatory of the operation of this invention system.

In the operation (iii), there is the possibility that before the temperature of the medium 27 raised by the first erasing beam has not sufficiently lowered, a mode magnetic field opposite to that during erasing is applied to the medium 27 to cause a reversal of the magnetization of the medium 27 regardless of whether the beam for recording is ON or OFF. Assuming that the temperature of the recording medium 27 is raised by the first erasing beam up to $T_2$ in FIG. 9 and that the temperature lowers to $T_1$ when the spot comes under the recording beam, and letting the coercive forces of the recording medium 27 at the temperatures $T_1$ and $T_2$ be represented by $H_{C1}$ and $H_{C2}$, respectively, the aforesaid phenomenon can be prevented by controlling a bias magnetic field so that $H_{C1} < H < H_{C2}$.

Figure 10:
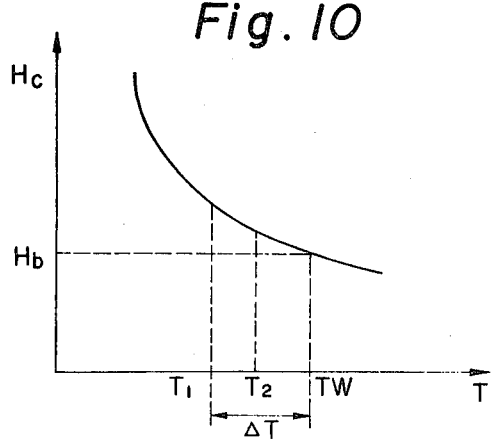

In this multi-beam system, it is also possible to make positive use of heat left by the first beam irradiation when recording or erasing with a recording medium of high coercive force. In FIG. 10, in a case where due to a power shortage of the first beam, the temperature of the recording medium rises only to $T_2$ below a temperature $T_W$ at which recording is possible and the temperature drops to $T_1$ when the irradiated spot comes under the second beam, its power can be used to fill up the shortage of power for raising the temperature by $\Delta T = T_W - T_1$, thereby permitting recording or erasing.

In the foregoing, known driving means may be employed for moving the optical system and the mode magnetic field generating means or the recording medium relative to each other so that the beam may shift on the recording medium.

The foregoing description has been given of the case where the beam spacing is considered to be fixed but, if the beam spacing is made variable, then a higher power can be obtained by applying a plurality of beams to exactly the same spot when filling up the aforesaid shortage of power.

As has been described in the foregoing, the magneto-optical recording and reproducing device of the present invention is capable of simultaneously performing two or three of the erasing, recording and reproducing operations by the use of a plurality of beams which is impossible with the prior art system. Further, the device of the present invention also permits the use of a recording medium of high coercive force by filling up a power shortage with a plurality of beams when recording or erasing.

What we claim is:

1. A magneto-optical recording and reproducing system for recording information on a recording medium made of a magneto-optical recording material comprising; an optical system for applying a plurality of light beams on said recording medium for radiating the recording medium with incident radiation at a plurality of irradiated positions;

drive means for driving the optical system and the recording medium relatively to each other for shifting positions on the recording medium irradiated by said light beams; mode magnetic field generating means disposed for generating coercive fields of different coercive values applied to said recording medium forwardly and rearwardly of some of said irradiated positions; photo-detecting means for detecting reflected light from said medium; control means for effectively controlling said optical system, said drive means, said mode magnetic field generating means and said photo-detecting means for effecting selectively recording-reproducing concurrently or reproducing-erasing concurrently or erasing-recording of said information of said recording medium.

2. A magneto-optical recording and reproducing system for recording information on a recording medium made of a magneto-optical recording material according to claim 1, in which said recording medium is a flim, and in which a magnetization vector perpendicular to the surface of said film.

3. A magneto-optical recording and reproducing system for recording information on a recording medium made of a magneto-optical material according to claim 1, in which said magnetic mode generating means comprises two laterally spaced electromagnets.

4. A magneto-optical recording and reproducing system for recording information on a recording medium made of a magneto-optical recording material according to claim 1, in which said system comprises a head comprising said optical system, said mode magnetic field generating means and semiconductor laser means.

5. A magneto-field recording and reproducing system for recording information on a recording medium made of a magneto-optical recording material according to claim 4, in which said laser means comprises at least lasers for generating two light beams and including means to vary the intensity of one of the laser beams relative to the intensity of the other of said two beams.

6. A magneto-optical recording and reproducing system for recording information on a recording medium made of a magneto-optical recording material according to claim 5, including tracking means responsive to the detection of responsive light by said photo-detecting means to effect tracking by said beams of a record of information on the recording medium.

7. A magneto-optical recording and reproducing system for recording information on a recording medium made of a magneto-optical recording material according to claim 4, including a focusing mechanism for variably focusing said optical system under control of said photo-detection means in response to reflected light from a record on said recording medium detected by said photo-detecting means.

8. A magneto-optical recording and reproducing system for recording information on a recording medium made of a magneto-optical recording material according to claim 1, including the medium.

9. A magneto-optical recording and reproducing system for recording information on a recording medium made of a magneto-optical recording material comprising; means for applying two separate light beams on said recording medium for radiating the recording medium with incident radiation at a plurality of irradiated positions; and means including magneto means cooperative in use with said recording medium and the first-mentioned means for effectively using the two light beams for selectively recording information on said recording medium and concurrently reproducing as a readout signal information recorded on said recording medium, or alternately effectively using said light beam for concurrently producing said readout signal and erasing information recorded on said recording medium, or alternately effectively using said light beams for erasing information recorded on said recording medium and concurrently recording information on said recording medium.

10. A magneto-optical recording and reproducing system for recording information on a recording medium made of a magneto-optical recording material according to claim 9 in which said magneto means comprises a plurality of means for applying to said recording medium adjacent to some irradiated positions magnetic fields of different coercive values.

11. A magneto-optical recording and reproducing system for recording information on a recording medium made of a magneto-optical recording material comprising; means for applying two independent light beams on said recording medium with incident radiation at a plurality of irradiated positions; means including magneto means coactive with said recording medium and the first-mentioned means and using the two beams for concurrently effecting any combination of two of three functions comprising the functions of recording information on said recording information, erasing information recorded on said recording medium, and reading out information on said recording medium.

12. A magneto-optical recording and reproducing system for recording information on a recording medium made of a magneto-optical recording material, according to claim 11, including said recording medium.

13. A magneto-optical recording and reproducing system for recording information on a recording medium made of a magneto-optical recording material according to claim 11, in which the first-mentioned means comprises two lasers, and in which said magneto means comprises means for applying magnetic fields of different coercive values to said some of the irradiated positions on said recording medium.

* * * * *